(12) United States Patent
Hall (10) Patent No.: US 9,108,558 B2
(45) Date of Patent: Aug. 18, 2015

(54) VEHICLE TRAY

(75) Inventor: Jamie Vincent Clarke Hall, Thornlie (AU)

(73) Assignee: AUSTIN ENGINEERING LTD., Kewdale (AU)

( * ) Notice: Subject to any disclaimer, the term of this patent is extended or adjusted under 35 U.S.C. 154(b) by 0 days.

(21) Appl. No.: 13/817,292

(22) PCT Filed: Aug. 16, 2011

(86) PCT No.: PCT/AU2011/001044
§ 371 (c)(1),
(2), (4) Date: May 28, 2013

(87) PCT Pub. No.: WO2012/021925
PCT Pub. Date: Feb. 23, 2012

(65) Prior Publication Data
US 2013/0234468 A1 Sep. 12, 2013

(30) Foreign Application Priority Data

Aug. 16, 2010 (AU) .............................. 2010903676
Aug. 16, 2010 (AU) .............................. 2010903677

(51) Int. Cl.
*B62D 33/02* (2006.01)
*B60P 1/28* (2006.01)

(52) U.S. Cl.
CPC .. *B60P 1/28* (2013.01); *B60P 1/286* (2013.01)

(58) Field of Classification Search
CPC .. B62B 9/14; B62B 2205/22; B62B 2205/26; B62B 7/06; A47F 10/06; A47F 9/00; F21S 8/04

USPC ............................................... 296/183.2, 39.2
See application file for complete search history.

(56) References Cited

U.S. PATENT DOCUMENTS

| | | | |
|---|---|---|---|
| 2,380,861 A | | 7/1945 | Meyer et al. |
| 3,134,628 A | * | 5/1964 | Lackey et al. ............... 298/21 R |
| 3,306,654 A | * | 2/1967 | Curcio ....................... 296/183.1 |
| 3,462,187 A | | 8/1969 | Hassler |
| 3,472,548 A | * | 10/1969 | Comisac .................... 296/183.2 |
| 3,923,337 A | | 12/1975 | Kershaw et al. |
| 3,941,260 A | * | 3/1976 | Fisher et al. .................. 414/517 |
| 4,230,360 A | * | 10/1980 | Eisenman ................... 296/183.1 |
| 4,474,404 A | * | 10/1984 | Hagenbuch ................ 296/182.1 |
| 4,621,858 A | * | 11/1986 | Hagenbuch ..................... 296/56 |
| 4,750,776 A | | 6/1988 | Barben |
| 4,831,539 A | * | 5/1989 | Hagenbuch .................. 701/33.4 |
| 4,839,835 A | * | 6/1989 | Hagenbuch ................... 702/174 |
| 5,474,363 A | * | 12/1995 | Hagenbuch .................. 298/23 R |
| 5,662,374 A | * | 9/1997 | Wheeler .................... 296/183.2 |
| 5,887,914 A | * | 3/1999 | Hagenbuch ................ 298/23 R |
| 6,076,693 A | * | 6/2000 | Reiter et al. ................... 220/9.1 |
| 6,478,176 B1 | * | 11/2002 | Reiter et al. ................... 220/1.6 |

* cited by examiner

*Primary Examiner* — Kiran B Patel
(74) *Attorney, Agent, or Firm* — Rothwell, Figg, Ernst & Manbeck, P.C.

(57) ABSTRACT

A tray of a vehicle, the tray comprising a tray bed having a carrying surface for containment of a load, the tray bed comprising at least one panel defining at least a portion of the carrying surface, the at least one panel comprising a reinforced section. The invention also relates to a canopy of a tray of a vehicle, the canopy comprising a frame member adapted to receive a plate section defining a covering section for protecting a portion of the vehicle, the plate section comprising a reinforced plate section.

5 Claims, 14 Drawing Sheets

VEHICLE TRAY

CROSS REFERENCE TO RELATED APPLICATIONS

This application is a 35 U.S.C. §371 National Phase Entry Application from PCT/AU2011/001044, filed Aug. 16, 2011, and designating the United States, which claims priority under 35 U.S.C. §119 to Australian Patent Application No. 2010903676 filed Aug. 16, 2010 and to Australian Patent Application No. 2010903677 filed Aug. 16, 2010, which are incorporated herein in their entireties.

FIELD OF THE INVENTION

The present invention relates to trays to be located on vehicles for carrying of loads.

The invention has been devised particularly, although not necessarily solely, in relation to truck body trays.

BACKGROUND ART

The following discussion of the background art is intended to facilitate an understanding of the present invention only. The discussion is not an acknowledgement or admission that any of the material referred to is or was part of the common general knowledge in Australia or elsewhere as at the priority date of the application.

Trucks typically comprise a chassis having a cabin and an area for placing cargo or equipment. The area for placing the cargo or equipment comprises a tray adapted to receive and contain the cargo. In dump trucks the trays are pivotically connected to the truck frame allowing tilting of tray for releasing the load.

The trays of the trucks comprise a tray bed and a canopy.

The tray bed defines a carrying surface for placing of materials and goods. Also, the tray bed comprises side walls for containment of the materials or goods within the tray. During operation, the carrying surface is subject to large tensile loads and weight due to the material or goods carried in the tray beds. The large tensile loads and weight may permanently damage the carrying surface and side walls of the tray beds. Also, the tray bed or the canopy may be perforated by heavy loads which fall on the carrying surface of the tray bed or the covering section of the canopy during loading of the tray.

The canopy of the tray defines a roof like structure including a covering section which extends outward from the tray bed towards the front end of the truck. The canopy covers the truck cabin to protect the cabin and the truck driver located inside the cabin from materials that may fall on the canopy instead than into tray bed during a loading operation.

The tray bed as well as the canopy must be adapted to carry heavy loads. Therefore, the trays are manufactured using materials that can withstand the large loads and weight to which the trays are subjected. This makes the trays heavy as well as expensive.

During continuous operation of the trays the heavy loads and irregular shaped materials may permanently damage the trays. Also, for example heavy loads falling on the trays during filling of the tray may perforate the surfaces of the tray bed and/or the canopy. After perforation or permanent damage of the tray, the tray must be refurnished or disposed of.

Refurbishment or disposal of the tray due to permanent damage is expensive and a waste of materials.

It is against this background that the present invention has been developed.

SUMMARY OF THE INVENTION

According to a first aspect of the invention there is provided a tray of a vehicle, the tray comprising a frame and a tray bed having a carrying surface for containment of a load, the tray bed comprising at least one panel defining at least a portion of the carrying surface and the frame being adapted to slideably receive and support the at least one panel, the at least one panel comprising a reinforced section wherein the at least one panel is releasably attached to the frame.

According to a second aspect of the invention there is provided a tray of a vehicle, the tray comprising a frame and a tray bed having a carrying surface for containment of a load, the tray bed comprising at least one panel defining at least a portion of the carrying surface and the frame being adapted to receive and support the at least one panel, the at least one panel comprising a reinforced section, wherein the at least one panel defines the carrying surface together with exposed areas of the frame.

Preferably, the at least one panel is releseably attached to the frame.

Preferably, the frame is adapted to slideably receive the at least one panel.

Preferably, the reinforced section comprises reinforcement means.

Preferably, the reinforcement means comprises corrugations.

Preferably, the reinforcement means comprises ribbings.

Preferably, the load carrying surface of the tray bed is defined in its entirety by the at least one panel.

Preferably, the frame comprises a plurality of side beams and a front beam, the side beams arranged in a spaced apart relationship with respect to each other and the front beam being located between the side beams defining a perimeter frame wherein the at least one panel is supported onto the perimeter frame.

Preferably, the at least one panel comprises a floor section and side wall sections defining the tray bed for carrying and containment of the load.

Preferably, the at least one panel is disposed at locations of the tray bed proclive to be damaged during operation of the tray.

Preferably, the carrying surface is defined by a plurality of panels.

Preferably, the plurality of panels comprise at least one first panel and at least one second panel, the at least one first panel are adapted to support heavier loads and having higher impact resistance than the at least one second panel, wherein the at least one panel is located at the locations proclive to be damaged during operation of the tray and the at least one second panel are located at locations less proclive to be damaged with respect to the locations of the at least one first panels.

Preferably, the at least one first and second panels are releasably attached to the frame of the tray.

According to a third aspect of the invention there is provided a canopy of a tray of a vehicle, the canopy comprising a frame member adapted to receive a plate section defining a covering section for protecting a portion of the vehicle, the plate section comprising a reinforced plate section wherein the plate section is releasably attached to the frame member.

Preferably, the frame member is adapted to slideably receive the plate section.

Preferably, the frame member comprises arm members located opposite to each other between which the plate section is located.

Preferably, the arm members have flanges for receiving the side ends of the plate section for supporting the plate section.

Preferably, the front and rear ends of the arm members are united by cross pieces.

Preferably, the cross pieces are adapted to support the front end and rear end of the plate section.

Preferably, the plate section comprises a reinforced plate section.

Preferably, the reinforced plate section comprises a corrugated plate.

Preferably, the frame member comprises a headboard that secures the plate section within the frame member of the canopy.

Preferably, the headboard is releasably attached to the frame section.

Preferably, the headboard is adapted to protect the front end of the plate section.

Preferably, the headboard comprises an extension for covering the front end of the plate section.

Preferably, the reinforced plate section comprises reinforcement means.

Preferably, the reinforcement means comprise corrugations.

Preferably, the reinforcement means comprises ribbings.

Preferably, the frame member of the canopy is adapted to be releasably attached to the tray.

BRIEF DESCRIPTION OF THE DRAWINGS

The present invention will be better understood by reference to the following description of specific embodiments thereof as shown in the accompanying drawings, in which.

DETAILED DESCRIPTION OF SPECIFIC EMBODIMENT(S)

Figure 1:
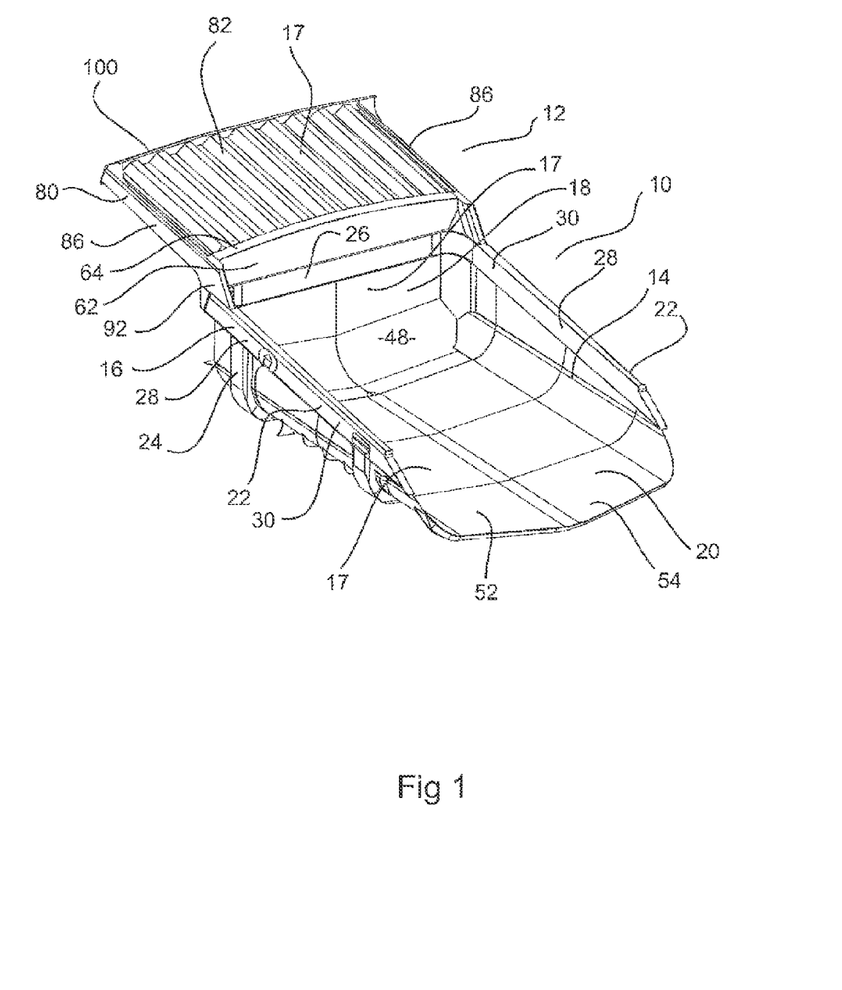
FIG. 1 is a top perspective view of a tray for a vehicle of a first embodiment of the invention.
Figure 2:
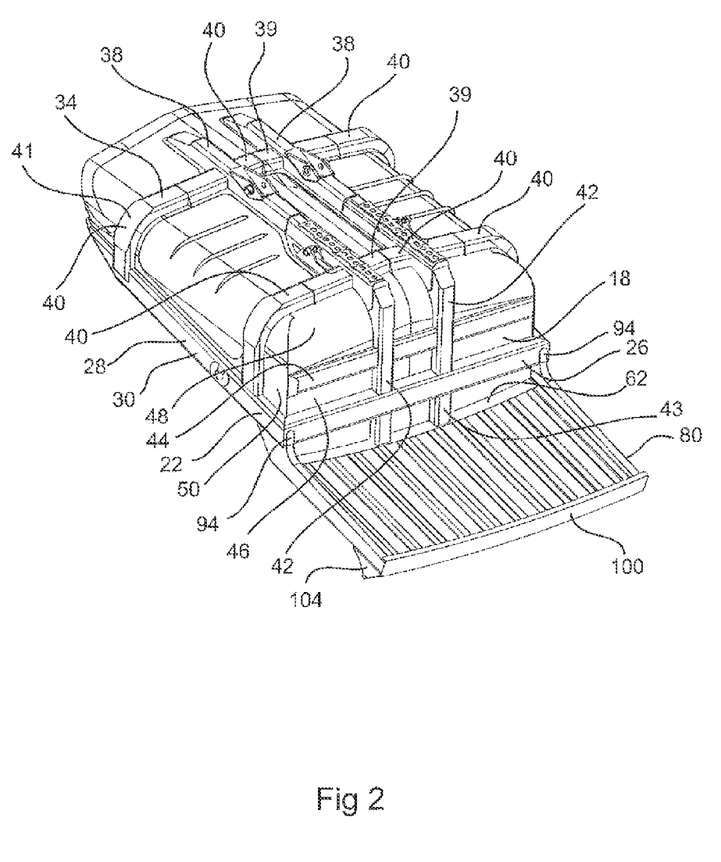
FIG. 2 is a bottom perspective view of a tray according to the embodiment of the invention shown in FIG. 1.
Figure 3:
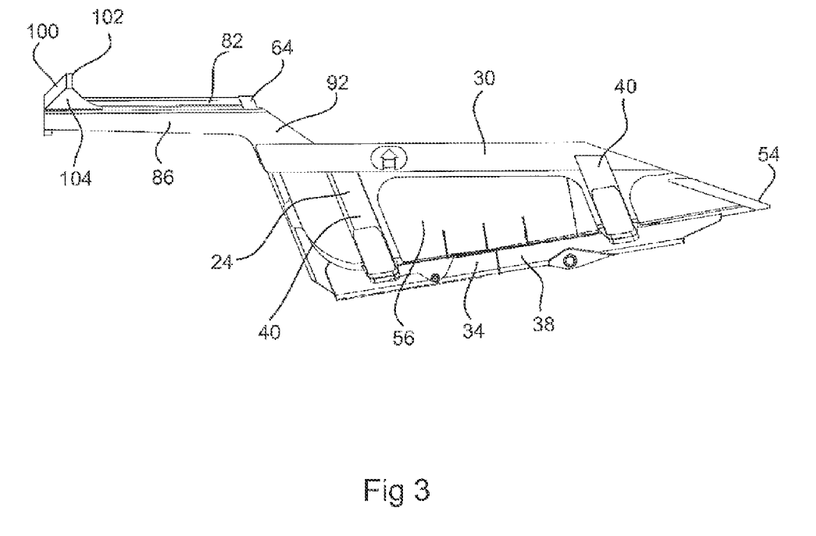
FIG. 3 is a side view of a tray according to the embodiment of the invention shown in FIG. 1.

FIGS. 1 to 3 show a tray 10 according to an embodiment of the invention. The tray 10 is of the type to be attached on the back frame of a vehicle such as a truck or utility vehicle for carrying materials or goods. The tray may also be attached to trailers for such vehicles or trains.

The tray 10 comprises a canopy 12 and a tray bed 14. The tray bed 14 defines a carrying area for containment of a load such as materials or goods. The canopy 12 extends forwardly from the tray bed 14 towards the front end of the vehicle to which the tray is attached. The canopy 12 defines a covering section for protecting the cabin of the vehicle and the interior of the cabin.

The tray bed 14 comprises a frame 16 and panels 17 attached to the frame. The panels 17 define wall sections 18 and floor sections 20. The wall sections 18 and the floor sections 20 together with exposed parts of the frame 16, define the load carrying area.

The frame 16 is defined by an arrangement of upper beams 22 and an arrangement of lower supporting beams 24.

The arrangement of upper beams 22 comprises a front upper beam 26 and two side beams 28. Each side beam 28 is attached to an end of the front upper beam 26. The side beams 28 are perpendicular to the front upper beam defining a U-shaped upper frame 30.

The lower supporting beams 24 form a bottom frame 34 attached to the upper frame 30. The lower supporting beams 24 are interconnected so as to form a grid like structure defining the bottom frame 34.

The bottom frame 34 comprises central beams 38 and side beams 40 attached to the central beams 38. The central beams 38 extend longitudinally from the front end of the tray 10 to the rear end of the tray 10. The central beams 38 are spaced apart and attached to each other by middle sections 39 of the side beams 40. The side beams 40 are spaced apart along the length of the central beams 38.

End sections 41 of the side beams 40 extend perpendicularly from the sides of the central beams 38 and terminating at the upper side beams 28. The end sections 41 of the side beams 40 have a curved configuration.

A front column 42 is attached to the frond end of each of the central beams 38. The front columns 42 extend perpendicularly from the front end of each of the central beams 38 to the upper front beam 26. A cross beam 44 extend perpendicularly from the front columns 42. As shown in FIG. 2, the junction between the front columns 42 and the central beams 38 have a curved configuration. As will be described with reference to the carrying surface of the tray bed 14, the curved configuration provides support for the panels 17 forming the front portion of the tray 10, as will be explained later.

The frame 16 is configured as a cradle to support the panels 17 that form the walls and the floor of the tray bed 14.

Referring to FIG. 1, a front wall portion 18 and a floor section 20 define the walls and the floor of the tray bed 14.

The front wall portion 18 closes the front portion of the frame 16. The front wall portion 18 comprises a vertical wall section 46, a curved floor section 48 and a pair of side wall sections 50. The vertical wall section 46 is attached to the upper beam 26 and rest on the front columns 42 and cross beam 44 of the tray frame 16.

The ends of the curved floor section 48 join the vertical wall section 46 and the floor section 20. The curved floor section 48 rests on the curved junction by the central beams 38 and the front columns 42. The side sections 50 extend from the sides of the vertical wall section 46 and the curved floor section 48 towards the end portions of the side beams 40. This arrangement closes the front portion of the frame 16.

Any attachment means, such as welding or mechanical fastening (such as bolting) are suitable for fixing the wall, floor and side sections 46, 48 and 50 to the frame 16.

The floor section 20 is adapted to receive a floor panel 52. The floor panel 52 is configured so as to cover the floor and the side walls of the frame 16.

The floor panel 52 comprises a floor surface 54 and wing members 56. The floor surface 54 covers the floor of the frame 16. The wing members 54 seal the side walls of the frame 16.

The floor panel 52 may be a single piece or made out of a plurality sections joined together to form the panel 52.

The floor panel 52 comprises an open front end 58 and an open rear end 57. The front end 58 is adapted to join the curved floor section 48 of the front wall portion 18. The remaining portions of the floor panel are attached to the frame 16. In this way the floor panel is fixed to the frame 16.

Any attachment means, such as welding or mechanical fastening (such as bolting) are suitable for fixing the floor panel 52 to the frame.

The rear end 58 of the tray 10 rests on the ends of the central beams 38. This provides an open end adapted to receive or discharge the materials or goods.

In the embodiment shown in FIGS. 1 to 3, the end section of the tray bed 14 is open. However, other embodiments of the invention may include gates. The gates impede release of the load during movement of the truck. The load may be released by opening the gates.

Figure 4:
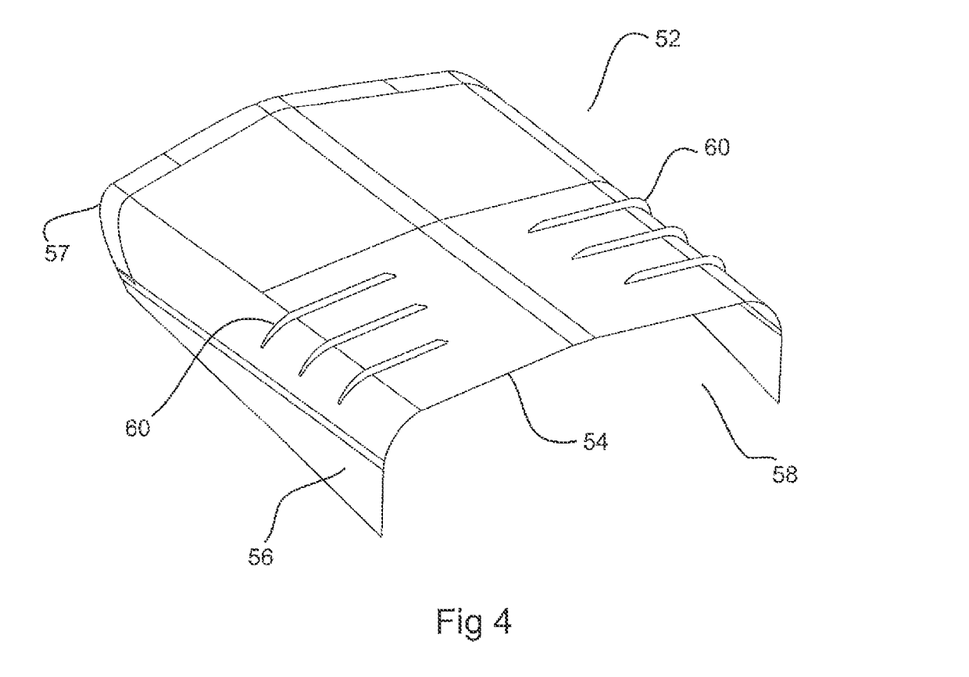
FIG. 4 is a bottom perspective view of a floor panel used in the tray shown in FIG. 1.

Referring to FIG. 4, the floor panel 52 include means for reinforcing the surface on which the load is placed. As shown in FIG. 4, the bottom surface of the floor panel 52 comprises ribbing 60 for reinforcement of the load carrying surface of the tray bed.

The ribbing 60 increases the load bearing characteristic of the carrying surface as well as the resistance to impacts due to the load during, for example, loading of the tray.

Figure 5:
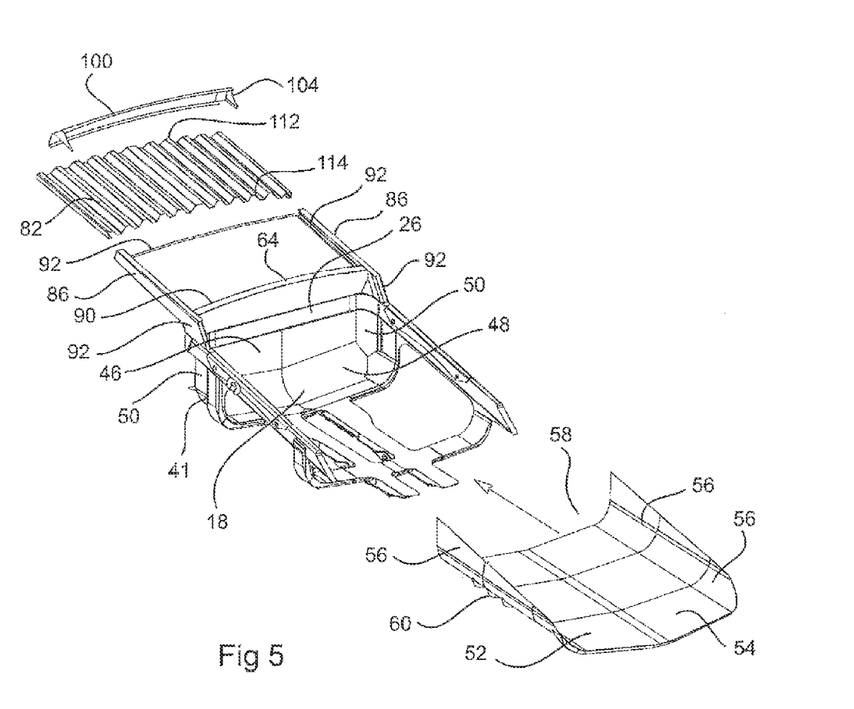
FIG. 5 is a top perspective view of a first arrangement of a tray according to the embodiment of the invention shown in FIG. 1 during assembly.
Figure 6:
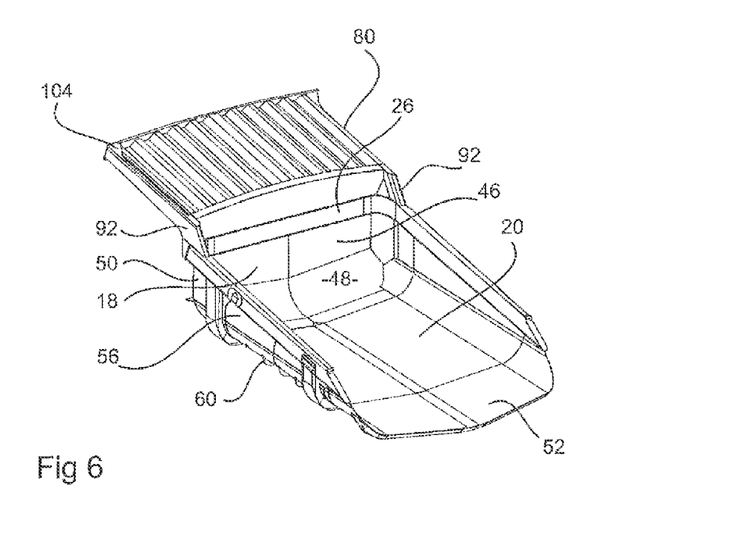
FIG. 6 is a top perspective view of a first arrangement of a tray according to the embodiment of the invention shown in FIG. 1 after assembly.

FIGS. 5 and 6 shows a canopy 12 in accordance to a first arrangement. The canopy 12 extends forwardly from the tray bed 14 to cover a vehicle cabin.

The canopy 12 is attached to the upper front and side beams 26 and 28 of the frame 16 of the tray bed 14.

The canopy 12 comprises a frame member 80 adapted to support a panel 17 defining a plate section 82. The plate section 82 defines the covering section for protecting the cabin of the vehicle.

The frame member 80 comprises arm members 86 defining the sides of the frame member 80. The arm members 86 are opposite to each other and separated by front and end support members 88 and 90. The support members 88 and 90 are located at the front and rear ends of the canopy 12 and provide support to the plate section 82. Also, the arm members 86 comprise guide means 92 for supporting and guiding of the plate section 82 during assembly of the canopy 12.

The arm members 86 comprise extensions 92 which attach to the front end of the upper front and side beams 26 and 28 of the tray bed 14.

The upper front and side and beams 26 and 28 of the tray bed are adapted to receive the ends of extensions 92. As shown in FIG. 2, indentations 94 are located at each junction between the upper front and side beams 26 and 28. The indentations 94 are adapted to receive extensions 92.

Further, a plate 62 is attached between the upper front beam 26 of the tray bed 14 and the rear end of the canopy 12. The middle portion of plate 62 rests on extensions 43 of front columns 42. The plate 62 impedes material passing through the gap formed between the tray bed 14 and the canopy 12.

Any attachment means, such as welding or bolting are suitable for detachably fixing the extensions 92 of the arm members 86 to the upper front beam 26. The plate 62 may also be detachably fixed in position by welding or bolting.

This arrangement allows detachment of the canopy 12 from the tray bed 14. This is particularly useful for replacement of the canopy 12 in circumstances where the canopy is damaged. For example, the frame member of the canopy 12 may be damaged due to impacts from the material loaded into the tray. Under these circumstances, the canopy 12 may be detached from the tray bed 14 for repair or replacement.

Further, as mentioned before, the frame member 80 of the canopy 12 is adapted to receive a plate section 82 which defines the covering section of the canopy 12 to protect the cabin of the vehicle. The plate section 82 is detachably secured within the frame member 80. This arrangement allows replacement of the plate section 82 if the plate section 82 is damaged, without having to replace the canopy 12.

In accordance with the first arrangement of the canopy 12, the plate section 82 is slideably inserted between the arm members 86 of the canopy 12 (see FIG. 5). During assembly of the canopy 12, the guide means 92 of the arm members 86 guide the plate section 82 into position.

For securing the plate section 82 within the frame member a headboard 100 (see FIGS. 5 and 15) is attached to the arm members 86 and to a front crossbar acting as support member 88. The headboard 100 spans from one arm member 86 to the opposing arm member 86.

Figure 15:
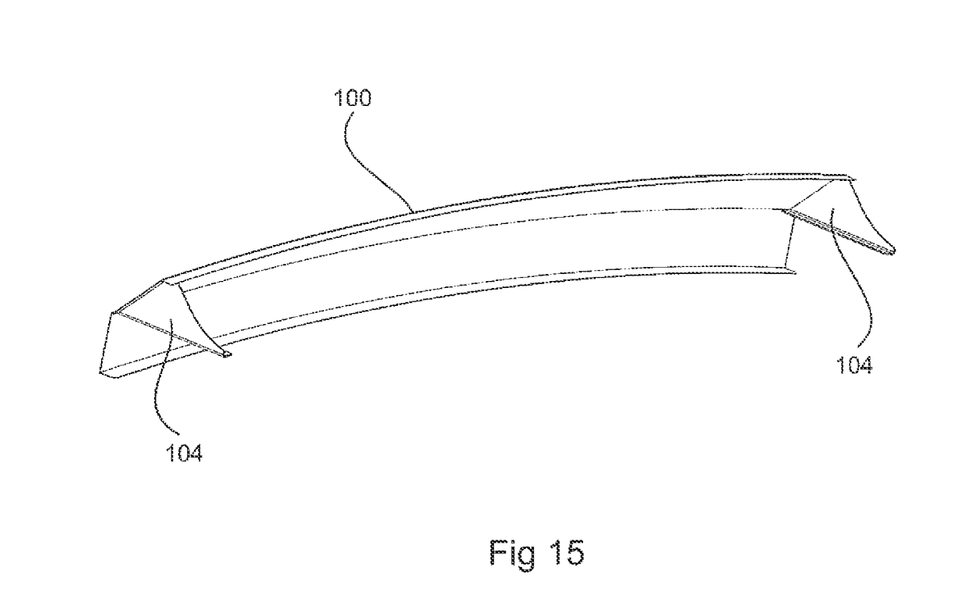
FIG. 15 is a rear perspective view of a headboard according to the first to third embodiments of the invention.

The headboard 100 may be releasably secured to the frame member 80 of the canopy 12. This allows for replacement of the plate section 82 in case the plate section 82 is damaged.

Any attachment means, such as welding or bolting are suitable for detachably fixing the headboard 100 to the arm members 86 and the support member 88.

Referring to FIG. 3, the headboard 100 comprises a roof section 102 which extends over the front end of the plate section 82. Bracket members 104 provide support to the upper portion of the headboard 100. This arrangement is particularly useful for protecting the front end of the plate section 82. Also, it impedes materials that may fall on the canopy to slide over the front end of the canopy and onto the cabin of the vehicle.

A plate 64 covers the rear end of the plate section 82 for protection of the rear end of the plate section 82. The plate 64 span from one arm member 86 to the opposing arm member 86 defining with crossbar 90 a recess adapted to receive the rear end of the plate section 82.

Figure 7:
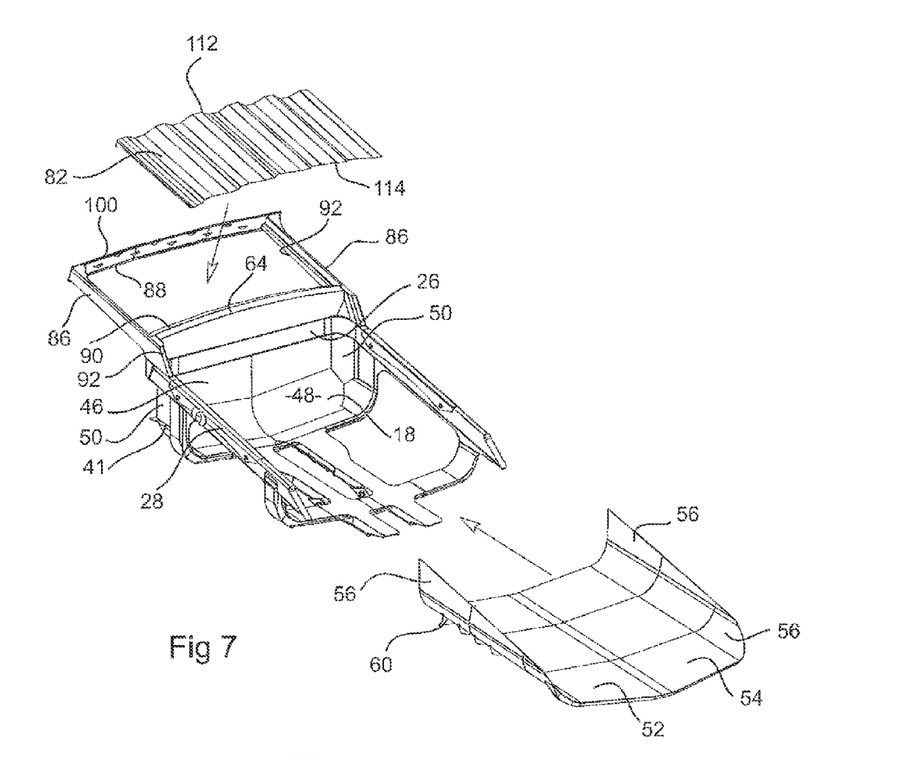
FIG. 7 is a top perspective view of a second arrangement of a tray according to the embodiment of the invention shown in FIG. 1 during assembly.
Figure 8:
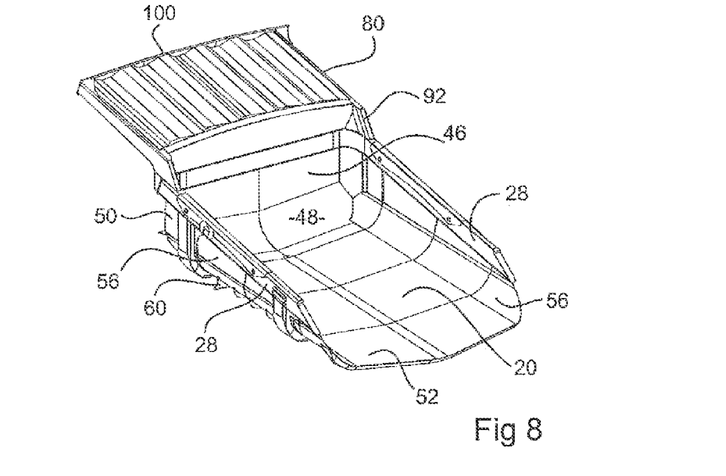
FIG. 8 is a top perspective view of second arrangement of a tray according to the embodiment of the invention shown in FIG. 1 after assembly.

FIGS. 7 and 8 show a canopy 12 in accordance with a second arrangement. The second arrangement of the canopy 12 is similar to the first arrangement of the canopy 12 shown in FIGS. 5 and 6. The difference between the second arrangement of the canopy 12 with respect to the first arrangement of the canopy 12, is the manner in which the panel 17 is attached to the canopy 12. In accordance with the second arrangement of the canopy 12, the panel 17 is placed on the arm members 86 and the support members 88 instead than (as is the case in the first arrangement) slid between the arm members 86.

As show in FIG. 7, the frame member 80 of the canopy 12 comprises the arm members 84 and front and end support members 88 and 90 as well as the headboard 100. The plate section 82 of the canopy 12 is defined by placing the panel 17 between the arm members 84 and the support members 88 and 90. As described with reference to the first arrangement of the canopy 12, the arm members 84 and the support members 88 and 90 provide support to the panel 17 to define the plate section 82.

Any attachment means, such as welding or bolting are suitable for detachably the panel 17 to the arm members 86 and the support member 88.

Referring to FIG. 2, the frame member 80 of the canopy 12 is attached to the tray bed 14. The arm members 86 comprise extensions 92 which attach to the front end of the upper front and side beams 26 and 28 of the tray bed 14.

The upper front and side and beams 26 and 28 of the tray bed 14 are adapted to receive the ends of extensions 92. Indentations 94 are located at each junction between the upper front and side beams 26 and 28. The indentations 94 are adapted to receive extensions 92.

Further, a plate 62 is attached between the upper front beam 26 of the tray bed 14 and the rear end of the canopy 12. The middle portion of plate 62 rests on extensions 43 of front columns 42. The plate 62 impedes material passing through the gap formed between the tray bed 14 and the canopy 12.

Any attachment means, such as welding or mechanical fastening (such as bolting) are suitable for fixing the extensions 92 of the arm members 86 to the upper front beam 26.

Figure 13:
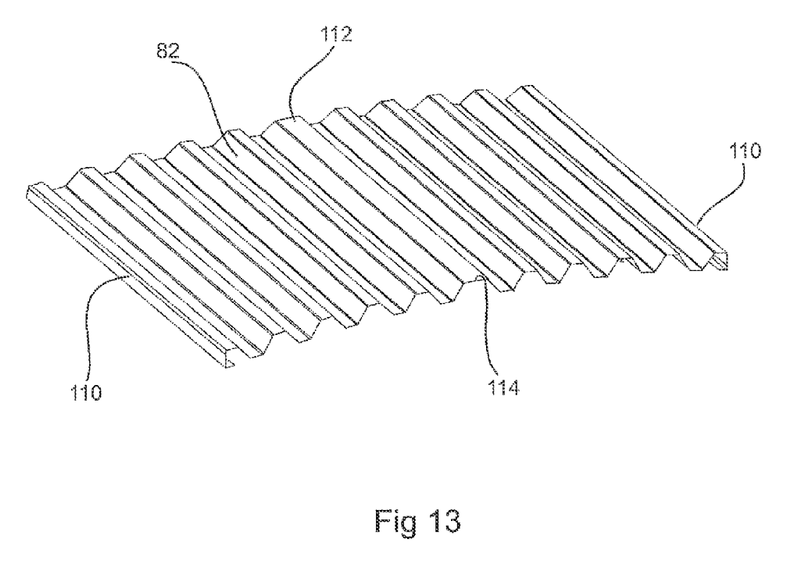
FIG. 13 is a perspective view of the corrugated plate forming the covering section of the canopy of the tray according to the first to third embodiments of the invention.
Figure 14:
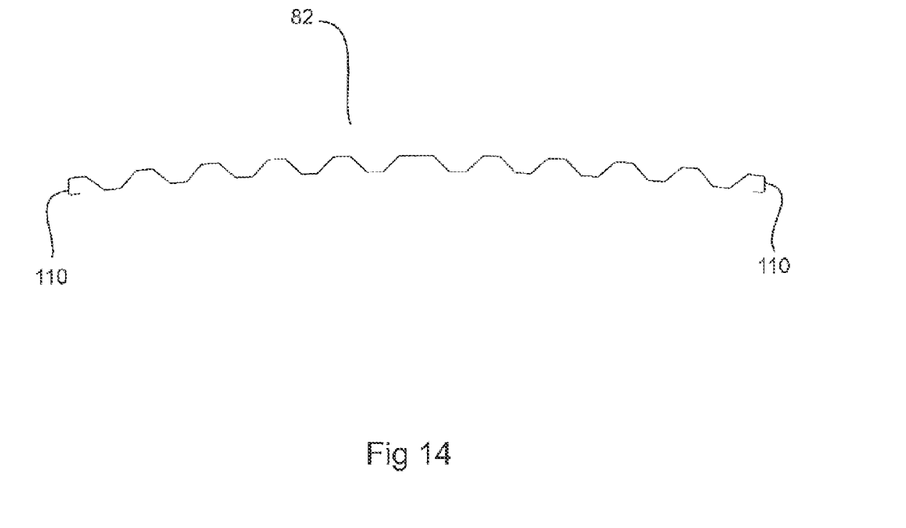
FIG. 14 is a side view of the corrugated plate forming the support surface of the canopy of the tray according to the first to third embodiments of the invention.

FIGS. 13 and 14 show the plate section 82 of the canopy 12. As shown in these figures the plate section 82 is of corrugated configuration. The corrugated profile increase the load bearing characteristic of the carrying surface as well as the resistance to impacts due to the load during loading of the tray.

A perspective view of the plate section 82 is shown in FIG. 13. The plate section comprises sides 110 and front and rear ends 112 and 114. The sides 110 of the plate section 82 are adapted to slide into the guide members 92 of the arm members 86 of the canopy 12. The sides 110 of the plate section 82 are configured so as to conform to the cross section of the guides members 92.

The corrugated plate section 82 is of curved configuration. This allows attachment of the plate to the frame member 80 which is of curved configuration.

However, plate sections 82 having other configurations may be used. For example, plate sections 82 may include reinforcement rips such as the floor panel 52 (see FIG. 4).

FIGS. 9 to 12 shows a tray 10 according to a second embodiment of the invention. The tray according to the second embodiment is similar to the apparatus according to the tray of the first embodiment and similar reference numerals are used to identify similar parts.

The tray 10 of the second embodiment comprises a floor panel 53 defining the load carrying area of the tray bed 14. The floor panel 53 is similar as the floor panel 52 of the first embodiment of the invention. However, the floor panel 53 does not comprise ribbing 60 for reinforcement of the floor panel 53. Instead, the floor panel 53 is configured to include a corrugated profile.

As said before, the corrugated profile increase the load bearing characteristic of the carrying surface as well as the resistance to impacts due to the load during, for example, loading of the tray.

Figure 9:
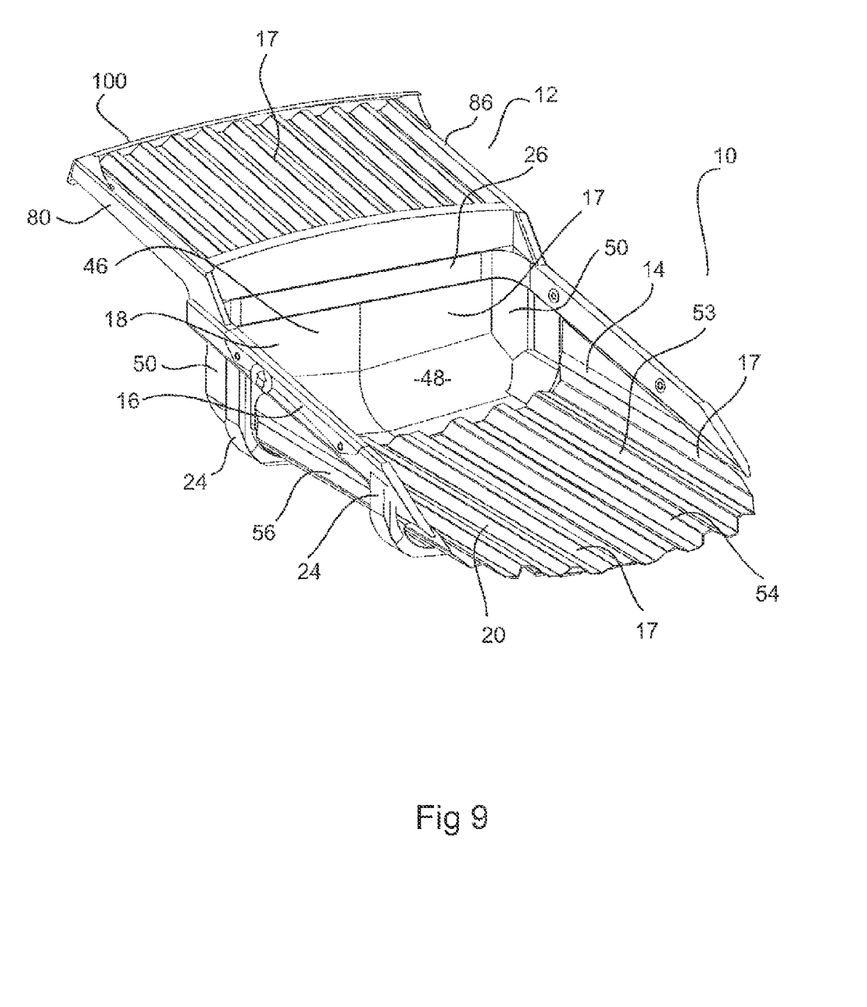
FIG. 9 is a top perspective view of a tray for a vehicle according to a second embodiment of the invention.
Figure 10:
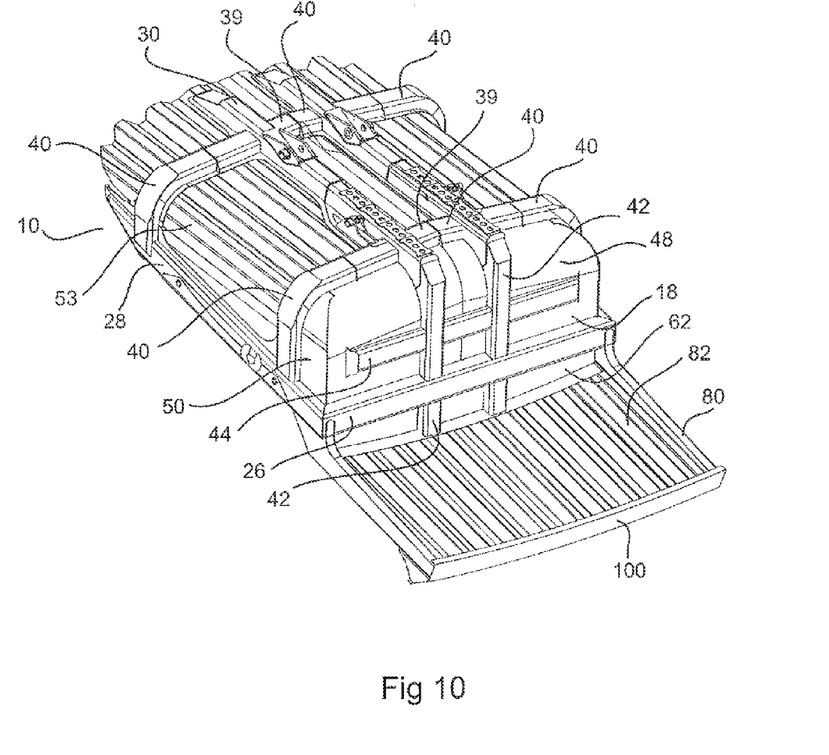
FIG. 10 is a bottom perspective view of a tray according to the embodiment of the invention shown in FIG. 9.
Figure 11:
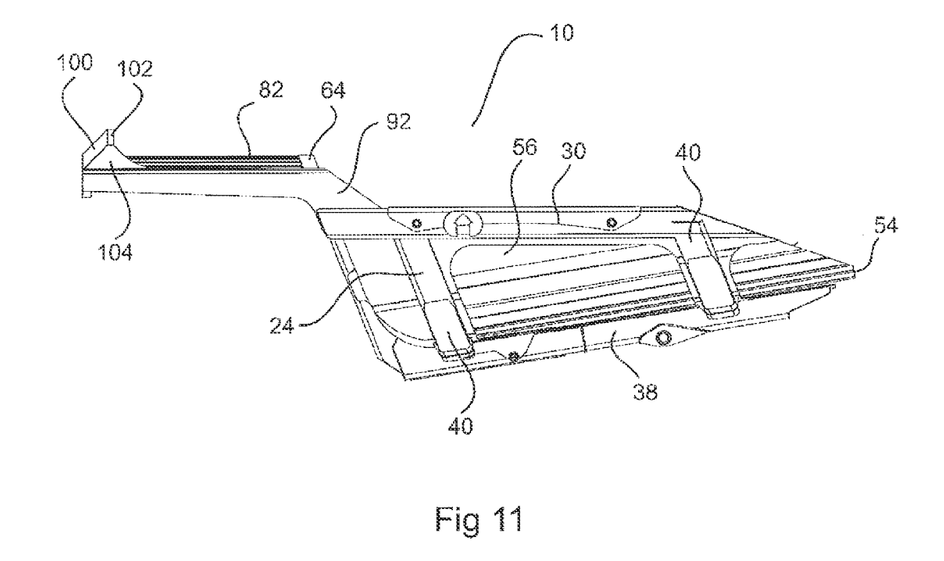
FIG. 11 is a side view of a tray according to the embodiment of the invention shown in FIG. 9.

As shown in FIGS. 9 and 10, the corrugated floor panel 53 comprises a floor surface 54 and wing members 56 supported on the frame 16 of the tray bed 14.

Any attachment means, such as welding or mechanical fastening (such as bolting) are suitable for fixing the floor panel 53 to the frame 16.

Figure 12:
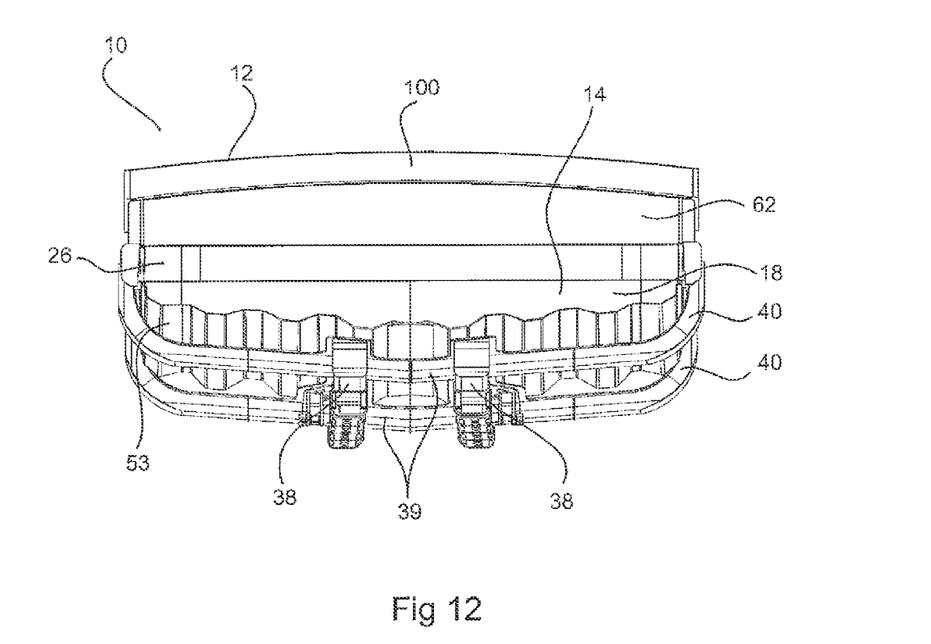
FIG. 12 is a rear view of a tray according to the embodiment of the invention shown in FIG. 9.

In this second embodiment, the floor panel 53 comprises a corrugated configuration. As shown in FIG. 12, the profile of the corrugated floor panel 53 is the same profile than the corrugated configuration of the plate section 82 of the canopy 12 (see FIG. 14). However, any type of configuration which increases the load and impact capacity of the floor panel 52 may be used.

Figure 16:
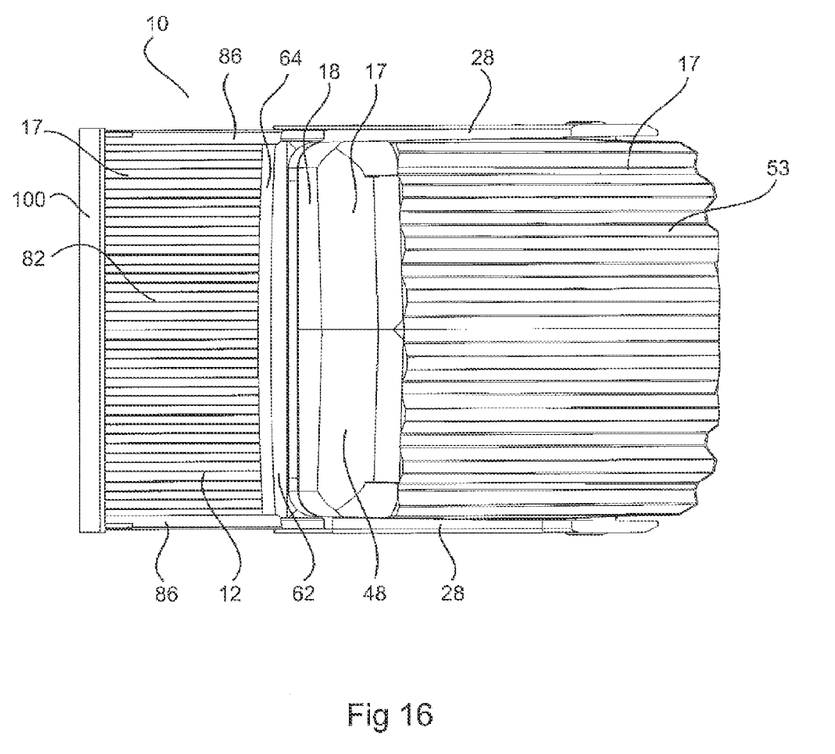
FIG. 16 is a bottom view of a tray according to a third embodiments of the invention.

FIG. 16 shows a tray according to a bottom view of a tray according to a third embodiment of the invention. The tray 10 according to the third embodiment is similar to the tray 10 according to first and second embodiment and similar reference numerals are used to identify similar parts.

The tray 10 of the third embodiment shows a tray having a floor panel 53 defining the load carrying area of the tray bed. In this third embodiment of the invention the floor panel 53 is configured to be adapted to support relatively heavy loads and impacts without the need to be supported by the bottom frame 34. Thus, the bottom frame 34 may be omitted. This substantially reduces the overall weight of the tray 10 and costs.

From the foregoing description, it is evident that the present invention provides a useful tray for a vehicle.

The use of reinforced panels in the construction of a tray 10 is particularly advantageous because it is possible to manufacture the tray 10 having a frame 16 constructed of robust and durable materials. The frame includes panels with reinforcement means (corrugated sections, ribbing, among others) to at least partially define the load carrying area of the tray bed. This is advantageous because the panels may be constructed of relatively cheap material and relatively light material.

Also, the use of panels 17 covering the frame 16 (to define the load carrying area of the tray bed or the covering section of the canopy) is particularly useful if the tray bed 14 is damaged or punctured, at, for example, a single location. In such a case the tray bed 14 need not be discarded. Rather, only the damaged panel or panels 17 need replacement.

The first and second arrangement of the canopy 12 which have been previously described are particular advantageous. As said before, the canopy 12 is detachably secured to the tray bed 14. This arrangement allows detachment of the canopy 12 from the tray bed 14. This is particularly useful for replacement of the canopy in the event that the canopy 12 is damaged without having to refurnish the entire tray 10. For example, the frame member 80 of the canopy 12 may be damaged due to impacts during loading of the tray bed 14. Under these circumstances, the canopy 12 may be detached from the tray bed 14 for repair or replacement.

Also, as previously described the plate section 82 is detachably secured within the frame member 80. This arrangement allows replacement of the plate section 82 without having to detach the canopy 12 from the tray bed 14. This is particularly useful, in case that only the plate section 82 of the canopy 12 is damaged and not, for example, the frame member 80 of the canopy 12. In accordance with the present embodiment of the invention only the plate section 82 needs to be replaced. This is accomplished by removing, for example, the headboard 100 from the frame member 80 and extracting the damaged plate 17 from the frame member 80. A new plate section 82 may be attached to the frame member 80 as was described with reference to the first or second arrangements of the canopy 12.

Alternatively, the plate section 82 may be extracted from the frame member 80 without removing the headboard 100. A new plate 17 may be inserted in the frame member 80 as shown in FIGS. 7 and 8.

Modifications and variations as would be apparent to a skilled addressee are deemed to be within the scope of the present invention.

For example, the tray 10 in accordance with the present embodiment of the invention may be adapted to be pivotically connected to the truck frame allowing tilting of the tray 10 for releasing the load. However, the present invention can be applied to any tray adapted to be attached to vehicles such as truck, utility vehicles, truck or train trailers, among others.

In the embodiments shown in the figures, the end section of the tray bed 14 is open. However, other embodiments of the invention may include gates. The gates impede release of the load during movement of the truck. The load may be released by opening the gates.

Further, it should be appreciated that the scope of the invention is not limited to the scope of the embodiments disclosed.

By way of example, as mentioned before, the panels 17 or the plate section 82 and the floor panel 52 and 53 comprises reinforcement means to increase the load bearing characteristic of the carrying surface as well as the resistance to impacts. The scope of the invention is not limited to the means for reinforcing (corrugated configuration and ribbing) described with reference to the first, second and third embodiment of the invention. Other means for reinforcing the panels may be used.

Also, not only the floor and wall section of the tray bed 14 can be defined by reinforced panels 17. Any area of the tray bed 14. 10 can be covered with reinforced panels 17. For example, the front wall section 18 and the plate 62 (see FIG. 1) can be manufactured using reinforced panels 52 or 53. In an embodiment of the invention the front wall section can comprise a plurality of panels 17 each defining the vertical wall section 46, the curved floor section 48 and side wall section 50.

This arrangement is particularly useful if the tray bed 14 is damaged or punctured, at, for example, a single location. In such a case the entire tray bed 14 need not be discarded. Rather, only the damaged panel 17 or panels 17 need replacement.

In an embodiment of the invention, the panels 17 may be detachably secured to the frame 16 of the tray 10. For example, the floor panel 52 (see FIG. 4) may be slideably inserted into the frame 16 of the tray 10 and detachably secured to the frame 16 of the tray 14.

Further, the load carrying area of the tray bed 14 may comprise a plurality of panels 17. The plurality of panels 17 may be disposed at locations of the tray bed proclive to be damaged during operation of the tray 10.

In an arrangement, a first group of panels 17 of the plurality of panels 17 that are adapted to support heavier loads and having higher impact resistance are located at the locations of the tray bed 14 more proclive to be damage. A second group of panels 17 which are adapted to support lighter loads and having a not so high impact resistance (with respect to the first group of panels 17) are located at locations of the tray bed less proclive to be damaged.

Moreover, the use of replaceable panels such as the floor portions 52 is particularly advantageous because it is possible to manufacture the tray 10 having a frame 16 constructed of robust and durable materials including panels constructed of relatively cheap material and relatively light material. Also, panels with reinforcement via corrugated sections or ribbing may also be attached to the frame 16.

This substantially reduces the overall weight of the tray 10. Also, the tray 10 does not need to be disposed of, or refurnished, in case of damage. If the tray bed 14 of a tray 10 is damaged, only the damaged panels need to be replaced.

Throughout the specification and claims, unless the context requires otherwise, the word "comprise" or variations such as "comprises" or "comprising", will be understood to imply the inclusion of a stated integer or group of integers but not the exclusion of any other integer or group of integers.

The claims defining the invention are as follows:

1. A vehicle tray having a floor and side walls defining a load carrying surface, the tray comprising a frame 16 and a single floor panel 52, the frame 16 comprising an upper frame 30 and a bottom frame 34 attached to the upper frame 30;

the upper frame 30 comprising a plurality of first side beams 28 and a front upper beam 26, the first side beams 28 extending longitudinally from the front upper beam 26 towards the rear portion of the tray;

the bottom frame 34 comprising a front wall portion 18 and a floor section 20, the floor section 20 comprising central beams 38 and a second side beam 40 extending transversally from the central beams 38, the second beam comprising ends attached to the first side beams 28 of the upper frame 30, wherein the second side beam 40 is spaced apart from the front wall portion 18 defining a void at each side of the central beams 38, each void extending between the front wall portion 18, the second side beam 40 and of first side beams 28; and wherein the single floor panel 52 comprises a floor surface 54 and wing members 56 slideably received by the floor section for covering of the voids to define the floor and side walls to provide the load carrying surface of the tray.

2. A tray of a vehicle according to claim 1 wherein the single floor panel 52 comprises a reinforcements means 60.

3. A tray according to claim 2 wherein the reinforcement means 60 comprises corrugations.

4. A tray according to claim 2 wherein the reinforcement means 60 comprises ribbings.

5. A tray according to claim 1 wherein the wing members 56 of the panel extend from sides of the floor surface 54 in a substantially perpendicular direction with respect to the floor surface 54.

* * * * *